United States Patent
Lindell et al.

(10) Patent No.: US 10,863,414 B2
(45) Date of Patent: Dec. 8, 2020

(54) SYSTEMS, METHODS, AND APPARATUSES FOR AUTHORIZING UTILIZATION OF ENHANCED COVERAGE

(71) Applicant: TELEFONAKTIEBOLAGET LM ERICSSON (PUBL), Stockholm (SE)

(72) Inventors: Per Lindell, Sodra Sandby (SE); Håkan Palm, Växjö (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/160,154

(22) Filed: May 20, 2016

(65) Prior Publication Data
US 2016/0345212 A1    Nov. 24, 2016

Related U.S. Application Data

(60) Provisional application No. 62/165,370, filed on May 22, 2015.

(51) Int. Cl.
*H04W 48/02* (2009.01)
*H04W 48/04* (2009.01)
(Continued)

(52) U.S. Cl.
CPC .............. *H04W 48/02* (2013.01); *H04W 8/24* (2013.01); *H04W 16/26* (2013.01); *H04W 36/06* (2013.01);
(Continued)

(58) Field of Classification Search
CPC . H04W 36/06; H04W 16/26; H04W 36/0027; H04W 48/02; H04W 48/04;
(Continued)

(56) References Cited

U.S. PATENT DOCUMENTS 9,860,731 B1 *   1/2018  Noonan ................ G01S 5/0221
2014/0307621 A1 * 10/2014 Frenger ............ H04W 56/0025
                                                        370/328
(Continued)

FOREIGN PATENT DOCUMENTS

EP         2 836 029 A1     11/2015

OTHER PUBLICATIONS

Intel Corporation. Email discussion report on [89bis#24][LTE/MTCe2] SIB Contents. 3GPP TSG RAN WG2 Meeting #90 R2-152161. Fukuoka, Japan, May 25-29, 2015.
(Continued)

*Primary Examiner* — Bobbak Safaipour (57) ABSTRACT

According to certain embodiments there is disclosed herein a method for authorizing utilization of enhanced coverage. The method comprises receiving a first message indicating that a first wireless device supports one or more enhanced coverage features. The method additionally includes obtaining an identification of the first wireless device. The method further includes obtaining, based on the identification of the first wireless device, an indication of whether the first wireless device is authorized to access the one or more enhanced coverage features or the first wireless device is not authorized to access the one or more enhanced coverage features.

18 Claims, 7 Drawing Sheets

(51) Int. Cl.
    *H04W 48/16*     (2009.01)
    *H04W 8/24*     (2009.01)
    *H04W 16/26*     (2009.01)
    *H04W 76/34*     (2018.01)
    *H04W 76/18*     (2018.01)
    *H04W 36/06*     (2009.01)

(52) U.S. Cl.
    CPC ............ *H04W 48/04* (2013.01); *H04W 48/16* (2013.01); *H04W 76/18* (2018.02); *H04W 76/34* (2018.02)

(58) Field of Classification Search
    CPC ..... H04W 48/16; H04W 76/18; H04W 76/34; H04W 8/24; H04W 88/06
    See application file for complete search history.

(56) References Cited

U.S. PATENT DOCUMENTS

| | | | |
|---|---|---|---|
| 2016/0242229 A1* | 8/2016 | Balachandran | H04W 4/70 |
| 2016/0338005 A1* | 11/2016 | Lim | H04W 8/22 |
| 2017/0055250 A1* | 2/2017 | Lim | H04W 74/006 |
| 2017/0135005 A1* | 5/2017 | Basu Mallick | H04L 63/0853 |
| 2019/0182824 A1* | 6/2019 | Chatterjee | H04L 5/0053 |
| 2019/0274088 A1* | 9/2019 | Jain | H04L 1/08 |

OTHER PUBLICATIONS

NTT Docomo, Inc. On contents and size for SIB and MIB for LC/EC MTC UE. 3GPP TSG-RAN2#xx R2-151425. Bratislava, Slovakia. Apr. 20-24, 2015.

* cited by examiner

SYSTEMS, METHODS, AND APPARATUSES FOR AUTHORIZING UTILIZATION OF ENHANCED COVERAGE

TECHNICAL FIELD

Embodiments presented herein relate to wireless communication, and in particular to systems, methods, apparatuses, network nodes, wireless devices, computer programs, or computer program products for authorizing utilization of enhanced coverage.

BACKGROUND

Enhanced Coverage (EC): As used herein, EC denotes any additional features or capabilities that may be provided by a cell in wireless communication. For example, EC may include the EC concept covered in certain communication standards such as the one specified in TS36.300 (e.g., subclause 23.7b) (available at http://www.3gpp.org/ftp/specs/archive/36_series/36.300/36300-d30.zip), or TS36.331 (available at http://www.3gpp.org/ftp/specs/archive/36_series/36.331/36331-d10.zip). These may be used to secure communication between a wireless device and a network node. One such concept is to increase the coverage range of a cell when a UE uses any techniques or features (e.g., additional power, additional channel coding or repetitions of transmissions) that may be considered to be enhanced. These techniques often consume a substantial amount of additional radio resources. Network operators may wish to limit access to EC to those UEs that are authorized for EC operation.

Normal Coverage (NC): As used herein, NC denotes the cell coverage situation when a UE does not need to use any techniques (e.g., additional power, channel coding or repetitions of transmissions) covered by EC.

NC Area: The area of a cell that provides NC.

EC Area: The area of a cell that provides EC.

EC Operation: As used herein, EC Operation is used to denote a wireless device that is camped in the EC Area of a cell and is in communication with the network node of the cell or which is otherwise using EC features.

EC WD: A wireless device (WD) that is capable of operating in EC.

In the scope of 3GPP Rel-13 a feature for providing enhanced cell coverage is being studied. The techniques that will be used to accomplish the enhanced cell coverage beyond what is possible with existing techniques will require the use of more radio resources (additional "redundancy", e.g. repetitions and encoding) than are used in normal coverage. A WD in enhanced coverage will be more "costly" compared to a WD in normal coverage, as it will consume more radio resources for the same amount of data. For this reason, it may be desirable for a network operator to be able to control WD access to EC. For example, the network operator may want to limit EC access to only those WDs that have subscribed to using EC.

So far, cellular systems have not provided any efficient means or mechanisms to allow or prevent WD access depending on the radio coverage level within a cell. One example is that WDs close to the network node could get higher bit-rates, while WDs at the cell edge could get lower-bit-rates. The 3GPP Rel-13 feature for providing enhanced cell coverage needs a mechanism that is not yet in place. It may be desirable that EC operation is used only by UEs that are authorized by the network operator (e.g., subscribe to the service).

Existing solutions do not allow a network operator to reject or restrict access attempts to EC by an EC capable WD not authorized for EC operation (e.g., on a subscription basis). Existing solutions also do not prevent an EC capable WD that is not authorized for EC operation from camping on and triggering repeated access attempts of the EC features of cells, despite such access attempts having been rejected previously in the cell. Existing solutions do not enable a network operator to prevent or limit service to an EC capable WD that is not authorized for EC operation when the WD moves from a NC area to an EC area within a particular cell.

SUMMARY

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

An object of embodiments herein is to enable a network operator to deny, restrict and/or limit a WD's access to EC features. For example, if a WD is not subscribed to an EC service or if resources are constrained, then the WD may be denied (or only get limited) access to the EC features. The operator can thus avoid using unnecessary radio resources and/or provide additional levels of service.

According to certain embodiments, a method for authorizing utilization of enhanced coverage comprises receiving a first message indicating that a first wireless device supports one or more enhanced coverage features. The method additionally includes obtaining an identification of the first wireless device. The method further includes obtaining, based on the identification of the first wireless device, an indication of whether the first wireless device is authorized to access the one or more enhanced coverage features or the first wireless device is not authorized to access the one or more enhanced coverage features.

In some embodiments of the method, the first message may comprise a radio resource control message. The radio resource control method may comprise an indication that the first wireless device supports the one or more enhanced coverage features.

In certain embodiments of the method, the first message may be received using a first radio resource. The first radio resource may be reserved for use by wireless devices that support enhanced coverage and are using an enhanced coverage feature.

In particular embodiments, the method may additionally include, upon obtaining an indication that the first wireless device is authorized to access the one or more enhanced coverage features, transmitting an acknowledgement message to the first wireless device. The acknowledgement message may notify the first wireless device that it is authorized to use the one or more enhanced coverage features. In addition, upon obtaining an indication that the first wireless device is not authorized to access the one or more enhanced coverage features, the method may include transmitting a denial message to the first wireless device. The denial message may notify the first wireless device that it is not authorized to use the one or more enhanced coverage features.

In some embodiments, the method may also include, upon obtaining an indication that the first wireless device is authorized to access the one or more enhanced coverage features, continuing a wireless connection with the first wireless device using the one or more enhanced coverage features.

In certain embodiments, the method may also include, upon obtaining an indication that the first wireless device is not authorized to access the one or more enhanced coverage features, establishing a wireless connection with the first wireless device without using the one or more enhanced coverage features. In some instances, some of these embodiments may further include determining that the first wireless device requires the one or more enhanced coverage features to maintain the wireless connection. The method may then include dropping the wireless connection with the first wireless device.

In particular embodiments of the method, obtaining, based on the identification of the first wireless device, an indication of whether the first wireless device is authorized to access the one or more enhanced coverage features or the first wireless device is not authorized to access the one or more enhanced coverage features comprises receiving an update location acknowledgement from a home subscriber server.

According to certain embodiments, a network node for authorizing utilization of enhanced coverage comprises an interface configured to receive a first message. The first message may indicate that a first wireless device supports one or more enhanced coverage features. The network node may also comprise a processor coupled to the interface. The processor may be configured to obtain an identification of the first wireless device. The processor may further be configured to obtain, based on the identification of the first wireless device, an indication of whether the first wireless device is authorized to access the one or more enhanced coverage features or the first wireless device is not authorized to access the one or more enhanced coverage features.

According to particular embodiments, a network node for authorizing utilization of enhanced coverage comprises a processor and computer readable storage media. The storage media contains instructions executable by the processor. When executed, the network node is operative to receive a first message indicating that a first wireless device supports one or more enhanced coverage features. The network node is further operative to obtain an identification of the first wireless device. The network node is additionally operative to obtain, based on the identification of the first wireless device, an indication of whether the first wireless device is authorized to access the one or more enhanced coverage features or the first wireless device is not authorized to access the one or more enhanced coverage features.

In accordance with certain embodiments, a network node for authorizing utilization of enhanced coverage comprises a receive module. The receive module is configured to receive a first message indicating that a first wireless device supports one or more enhanced coverage features. The network node also includes a first obtain module that is configured to obtain an identification of the first wireless device. The network node additionally includes a second obtain module that is configured to obtain, based on the identification of the first wireless device, an indication of whether the first wireless device is authorized to access the one or more enhanced coverage features or the first wireless device is not authorized to access the one or more enhanced coverage features.

Advantageously one or more embodiments provide a network operator with a mechanism through which they can control access by WDs to enhanced coverage. This may allow the network operator to better manage wireless resources. Additionally, certain embodiments may reduce the amount of signalling (and thus conserve wireless resources) by having the wireless device store the indication as to whether or not it is authorized to use enhanced coverage. For example, if a WD has been notified that it is not authorized for enhanced coverage access it may avoid attempting to connect to, or use, an enhanced coverage feature.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example to help convey the scope of the inventive concept to those skilled in the art. Like numbers refer to like elements throughout the description.

Figure 1:
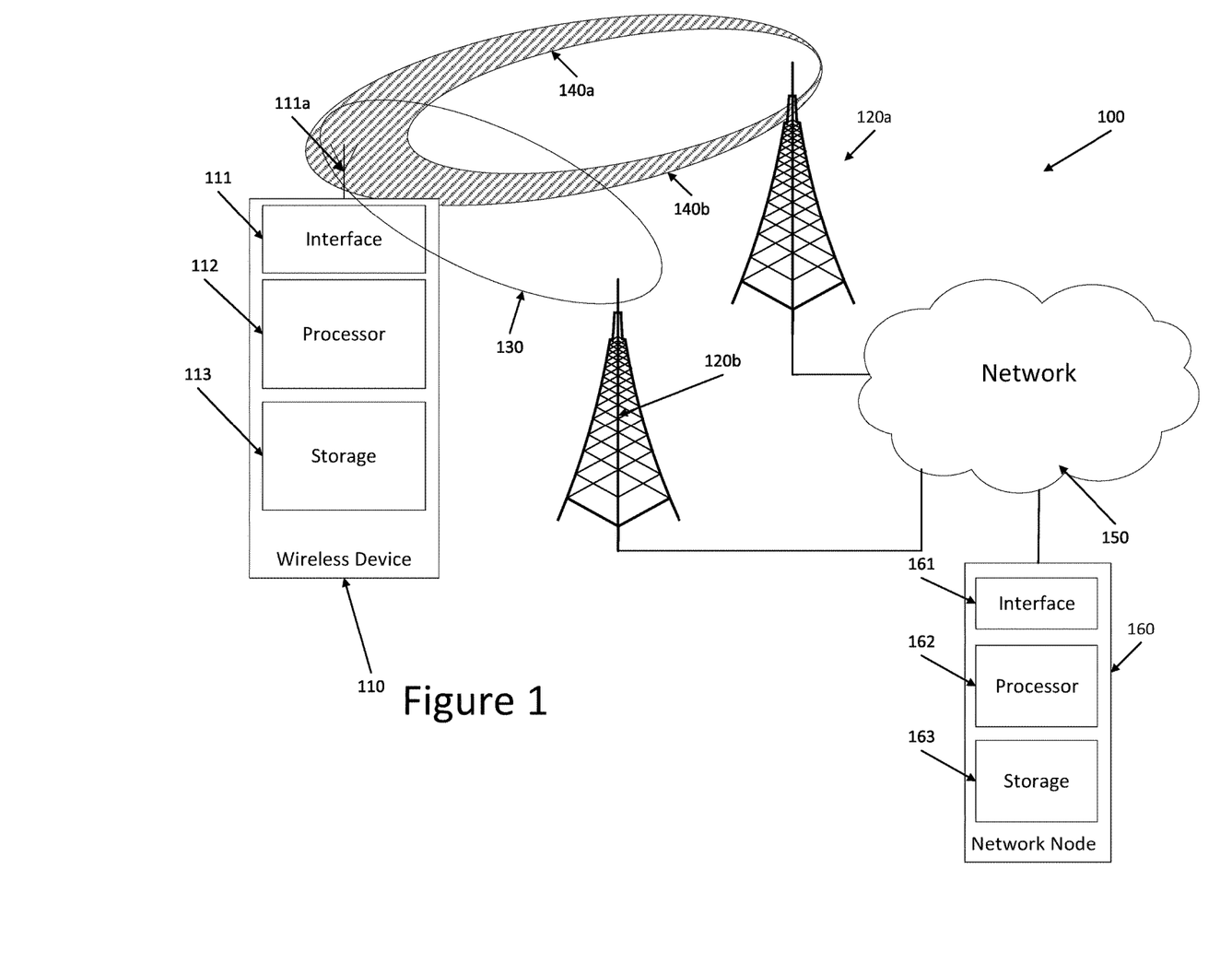
FIG. 1 illustrates a wireless network comprising a more detailed view of a network node and a wireless device, in accordance with a particular embodiment.

FIG. 1 illustrates a wireless network comprising a more detailed view of a network node and a wireless device, in accordance with a particular embodiment. For simplicity, the embodiment depicted in FIG. 1 only comprises network 150, network node 160, base stations 120a and 120b (collectively and/or generally referred to as base stations 120) and WD 110. Network node 160 comprises processor 162, storage 163, and interface 161. Similarly, WD 110 comprises processor 112, storage 113, interface 111 and antenna 111a. The components of base stations 120 may be similar to the components of network node 160 and are not illustrated for purposes of simplicity. The components of the various devices of network 100 may work together in order to provide a mechanism for controlling access to EC features and EC resources. In different embodiments, the wireless network may comprise any number of wired or wireless networks, network nodes, base stations, controllers, wireless devices, relay stations, and/or any other components that may facilitate or participate in the communication of messages and/or signals whether via wired or wireless connections.

Network 150 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. In addition, network 150 may comprise one or more control nodes (e.g., MMEs, HSSs, RNCs, BSCs, etc.), such as network node 160. A control node may be any type of network node that is responsible for managing one or more aspects of one or more other network nodes. A single control node, such as network node 160, may control several base stations 120.

Although network node 160 is used as a control node herein, the term network node is not intended to be limited in such a fashion. A network node may comprise any device used to transfer data or signals between other devices (including any routers, switches, base stations, transceivers, controllers, etc.) and/or any device used to monitor, control, or otherwise maintain a network (including, MMEs, HSSs, RNC, BSCs, etc.).

Focusing on network node 160, network node 160 comprises interface 161, processor 162, and storage 163. These components are depicted as single boxes located within a single larger box. In practice however, a network node may comprises multiple different physical components that make up a single illustrated component (e.g., interface 161 may comprise terminals for coupling wires for a wired connection and a radio transceiver for a wireless connection). As another example, network node 160 may be a virtual network node in which multiple different physically separate components interact to provide the functionality of network node 160 (e.g., processor 162 may comprise three separate processors located in three separate enclosures, where each processor is responsible for a different function for a particular instance of network node 160). Similarly, network node 160 may be composed of multiple physically separate components (e.g., a NodeB component and a RNC component, a BTS component and a BSC component, etc.), which may each have their own respective processor, storage, and interface components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may be considered a single separate network node. In some embodiments, network node 160 may be configured to support multiple RATs. In such embodiments, some components may be duplicated (e.g., separate storage 163 for the different RATs) and some components may be reused (e.g., the same antenna may be shared by the RATs).

Processor 162 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 160 components, such as storage 163, network node 160 functionality. For example, processor 162 may execute instructions stored in storage 163. Such functionality may include providing various wireless features discussed herein to a WD, such as WD 110, including any of the steps or methods disclosed herein. In certain embodiments, processor 162 may be used to determine whether or not WD 110 is authorized for EC access.

Storage 163 may comprise any form of non-transitory volatile or non-volatile computer readable memory including, without limitation, persistent memory, solid state memory, remotely mounted memory, magnetic media, optical media, random access memory (RAM), read-only memory (ROM), removable media, or any other suitable local or remote memory component. Storage 163 may store any suitable instructions, data or information, including software and encoded logic, utilized by network node 160. In some embodiments, storage 163 may store data that may be used to assess whether or not a particular WD is authorized for EC access. The information may be stored and/or maintained in a list, database, or other organization of data useful for obtaining an indication that that EC access is allowed for a WD based on, for example, an identification of the WD.

Network node 160 also comprises interface 161 which may be used in the wired or wireless communication of signalling and/or data between network node 160, network 150, and/or WD 110. For example, interface 161 may perform any formatting, coding, or translating that may be needed to allow network node 160 to send and receive data from network 150 over a wired connection. In some embodiments, such as when network node 160 is a base station, interface 161 may also include a radio transmitter and/or receiver that may be coupled to or a part of an antenna. The radio may receive digital data that is to be sent out to other network nodes or WDs via a wireless connection. The radio may convert the digital data into a radio signal having the appropriate channel and bandwidth parameters. The radio signal may then be transmitted via the antenna to the appropriate recipient (e.g., WD no). In some embodiments, interface 161 may receive various signal quality reports created by WD 110.

The antenna of, for example, a base station, may be any type of antenna capable of transmitting and receiving data and/or signals wirelessly. In some embodiments, the antenna may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 110 may be any type of wireless endpoint, mobile station, mobile phone, wireless local loop phone, smartphone, user equipment, desktop computer, PDA, cell phone, tablet, laptop, VoIP phone or handset, or smart equipment which is able to wirelessly send and receive data and/or signals to and from a network node, such as base station 120b, and/or other WDs. In some embodiments, WD 110 may be an EC capable WD. WD 110 comprises interface 111, processor 112, storage 113, and antenna ma. Like network node 160, the components of WD 110 are depicted as single boxes located within a single larger box, however in practice a WD may comprises multiple different physical components that make up a single illustrated component (e.g., storage 113 may comprise multiple discrete microchips, each microchip representing a portion of the total storage capacity). Also, in some embodiments, some of the features and/or functions of WD 110 may be performed or located remotely. For example, in some embodiments, storage 113 may include both local storage and remote storage (e.g., cloud based storage).

Processor 112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 110 components, such as storage 113, WD functionality. Such functionality may include providing various wireless features discussed herein, including any of the steps or methods disclosed herein.

Storage 113 may be any form of volatile or non-volatile memory including, without limitation, persistent memory, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by WD 110. In some embodiments storage 113 may maintain a list, database, or other organization of data that keeps track of whether or not WD 110 has been granted EC access. In some embodiments, this EC access information may be associated with specific cells, tracking areas (TAs) or a public land mobile network (PLMN).

Interface 111 may be used in the wireless communication of signalling and/or data between WD 110 and base station 120b. For example, interface iii may perform any formatting, coding, or translating that may be needed to allow WD 110 to send and receive data from network node 160 over a wireless connection. Interface 111 may also include a radio transmitter and/or receiver that may be coupled to or a part of antenna 111a. The radio may receive digital data that is to be sent out to base station 120b via a wireless connection. The radio may convert the digital data into a radio signal having the appropriate channel and bandwidth parameters. The radio signal may then be transmitted via antenna 111a to base station 120b.

Antenna 111a may be any type of antenna capable of transmitting and receiving data and/or signals wirelessly. In some embodiments, antenna ma may comprise one or more omni-directional, sector or panel antennas operable to transmit/receive radio signals between 2 GHz and 66 GHz. For simplicity, antenna ma may be considered a part of interface 111 to the extent that a wireless signal is being used.

In addition to the hardware components of FIG. 1, there is also illustrated a particular scenario comprising two cells, cells 130 and cell 140. In this scenario, the wireless network has been configured to use EC to extend the coverage area of cell 140. This is shown by dividing cell 140 into NC area 120a and EC area 140b. The communication between WD 110 and base station 120b may, for example, be an LTE link.

The components of WD 110 and network node 160 described in general above may be used in providing authorized (and conversely restricting unauthorized) access to EC services within a cell. Certain details of some of the ways in which these components may be used to do so will now be provided.

For purposes of explanation, it may be assumed that WD 110 is capable of using EC features. Accordingly, when interface 111 detects a wireless signal within EC area 140b, processor 112 may determine that WD 110 is within range of a cell that offers EC. WD 110 may provide or advertise its identity along with its ability to use EC. For example, processor 112 may include an indication in a message (e.g., an ATTACH, a TAU and/or an RRC message) that is sent via interface 111 to base station 120a. As another example, rather than including additional information in a message, processor 112 may configure interface 111 to use a specific set of resources (e.g., resources reserved specifically for EC) to send a traditional connection request message.

The interface of base station 120a may receive the message and either process it internally (similar to what is described below but using components associated with base station 120a) or it may relay the information therein to another network node, such as network node 160. In this example, network node 160 may be an MME. Interface 161 may receive a message indicating that WD 110 has EC capabilities. Processor 162 may use information in the message to obtain an identification of WD 110 and ascertain that WD 110 is requesting permission to access and/or use EC features.

Processor 162 may then determine that individual access restriction information, including EC information, is to be provided to base station 120a. Processor 162 may obtain an indication of whether WD 110, specifically, is authorized to access EC features based on the identification of WD 110. The indication may be provided to base station 120a. Base station 120a may then use the individual access restriction information for WD 110 to allow WD 110 to connect from EC area 140b. In some embodiments, the indication may be obtained from information already in storage 163. In some embodiments, interface 161 may receive a message, such as an update location acknowledgement message, from another network node, such as a home subscriber server. The message may include an indication as to whether or not EC access is authorized for WD 110. The message may be received in response to a request sent by interface 161 of network node 160. The request may have included the identification of WD 110.

Once processor 163 has obtained the indication as to whether or not WD 110 can access EC, the restriction information may be provided as part of a Handover Restriction List (HRL). In some embodiments, network node 160 may provide the restriction information even if WD 110 has not provided an indication of its EC capability. Base station 120a may then relay the restriction information to WD 110 so that WD 110 is notified as to whether or not it is authorized for EC access.

In some embodiments, storage 163 of network node 160 (or of another network node, such as an HSS) may maintain a list of authorized and non-authorized cells or TAs for which EC operation is authorized for each of a plurality of different WDs, including WD 110. The list may be maintained on a per-subscriber or a per-WD basis. This may be based on operator configuration. In some embodiments, EC access may be authorized or not authorized for specific cells, cells of specific TAs, or all cells of the PLMN. In such an embodiment where authorization is for the PLMN, it may not be necessary to maintain the list of authorized or non-authorized cells or TAs for EC operation.

In some embodiments, storage 113 of WD 110 may store an indication of whether or not EC access is allowed in all cells of the PLMN. Alternatively, in some embodiments, storage 113 of WD 110 may maintain a list of TAs where EC operation is authorized and/or not authorized. This list may be developed over time. For example, storage 113 may store the Tracking Area identity (TAI) for each cell where interface 111 received an indication of whether or not EC access is authorized. As long as WD 110 is moving between cells belonging to the same TA, WD no may refrain from accessing the EC features of those cells for which access has been denied. When WD no enters a cell belonging to a TA for which storage 113 does not have information stored, WD 110 may attempt to access EC features. The request may be rejected or approved by the respective network node, and storage 113 may then store updated information about this TA.

In some embodiments or scenarios, WD no may have established a wireless connection from EC area 140b. This connection may be established before either WD 110 or base station 120a is aware of whether or not WD 110 is authorized for EC access. When the restriction information arrives at base station 120a, the connection from EC area 140b may continue on a limited or restricted basis or the wireless connection may be dropped, depending on the information in the restriction message. In this scenario, because WD 110 is also in range of cell 130, WD 110 may be handed over to cell 130.

In some embodiments or scenarios, WD 110 may have established a wireless connection from NC area 140a and then may have moved into EC area 140b. In such a scenario, the connection may continue and start to use EC resources if WD 110 is authorized for EC usage. Conversely, if WD 110 is not authorized for EC usage, then when WD 110 moves into EC area 140b the wireless connection may be dropped or limited and WD 110 may search for a new cell, such as cell 130. In some embodiments or scenarios, where WD 110 is not authorized for EC access, base station 120a and WD 110 may establish, or attempt to establish, a wireless connection without using EC resources.

Figure 2:
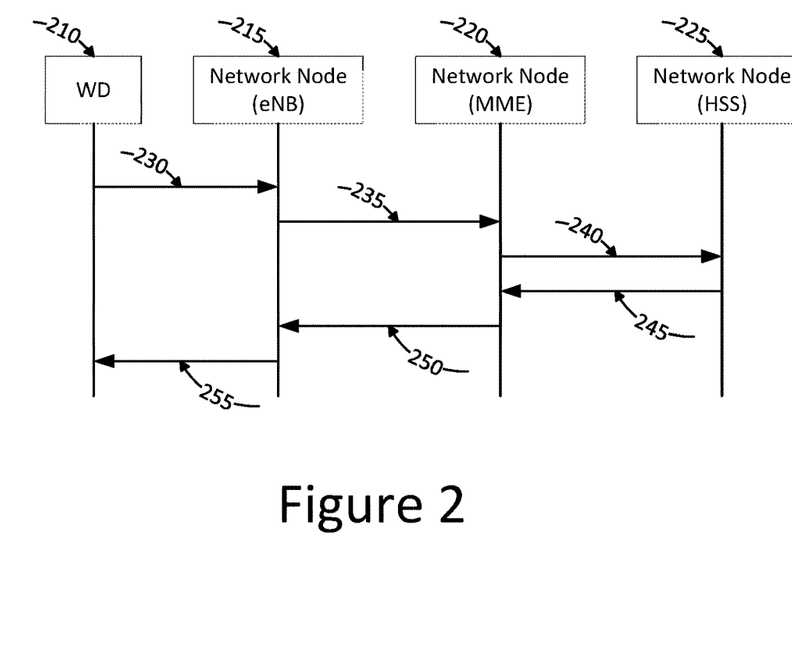
FIG. 2 illustrates a signalling diagram of the exchange of signals used in authorizing a wireless device for enhanced coverage access, in accordance with a particular embodiment.

FIG. 2 illustrates a signalling diagram of the exchange of signals used in authorizing a wireless device for enhanced coverage access, in accordance with a particular embodiment. As depicted, there is a single WD, WD 210 and three network nodes, network nodes 215, 220, and 225. In this particular signalling diagram network node 215 is an eNB, network node 220 is an MME, and network node 225 is an HSS. To aid in the readability of this description, network node 215 shall be referred to as eNB 215, network node 220 shall be referred to as MME 220 and network node 225 shall be referred to as HSS 225. Although these particular types of network nodes are being used for purposes of this description, any other similar network nodes may be used (e.g., eNB 215 may be BTS 215). Moreover, although three different network nodes are depicted, in some embodiments, two or more of the network nodes (or at least the functions relevant herein that are performed by a particular network node) may combined into a single network node. That is to say, the components and devices pictured in FIG. 2 are simply for purposes of discussion and should not be construed as a narrowing of the claimed invention. In addition, for simplicity, each exchange between components and devices is represented as a single arrow, however each arrow may represent one or more actual messages or signals. For example, message 230 may comprise a first message indicating that WD 210 supports EC access and a second message indicating that WD 210 is currently using EC features. It may also be assumed, for purposes of simplicity, that eNB 215 uses EC features to extended the coverage area.

Message 230 is sent by WD 210 to eNB 215. The message indicates that WD 210 supports EC. In some embodiments, WD 210 may also include in message 230 an indication of whether it is using EC access, is in an EC area or an NC area. In certain embodiments, the indication may be sent in a NAS message (e.g., an Attach or TAU request). In particular embodiments the indication may be sent in an RRC message (e.g., RRC Connection request or RRC Connection Setup Complete). In some embodiments, the indication may not be in the message itself, but rather in how the message is sent. For example, the network operator may have reserved one or more radio resources that are for EC use. If message 230 is sent using the reserved radio resources, it may be determined that WD 210 supports EC access. As another example, in some instances WD 210 may be in a NC area when message 230 is sent (and thus WD 210 is not using radio resources reserved for EC use) but WD 210 may still wish to indicate that it supports EC access. In such a scenario, WD 210 may use a preamble sequence associated with the set of radio resources reserved for EC access. In certain embodiments, WD 210 may have previously signaled its support for EC access. In some embodiments, eNB may store internally the fact that WD 210 supports EC access.

Message 235 is sent by eNB 215 to MME 220. The content of message 235 may be based on message 230. For example, if message 230 is a NAS message that includes EC access capability (e.g., TAU request noting "EC access supported") then eNB 215 may forward it as message 235. If message 230 is in an RRC message that includes the indication (e.g., the RRC message included "EC access used," or "EC access supported") then eNB 215 may add the "EC access supported" in an appropriate S1 message sent to MME 220. eNB may also store (e.g., in storage) the indication "EC access supported" for WD 210. Message 230 may also include an indication as to whether WD 210 is currently using EC or NC. This information may be included in the same or a different S1 message. For example, eNB 215 may add "EC access used" in the appropriate S1 message.

Message 240 is sent by MME 220 to HSS 225. Message 240 may comprise an update location request. In some embodiments, message 240 may contain an indication that WD 210 has EC capabilities (e.g., "EC access supported").

Message 245 is sent by HSS 225 to MME 220. Message 245 may comprise an update location acknowledgment. In some embodiments, message 245 may include the individual access restriction information for WD 210. For example, message 245 may include a cause code such as "EC access [allowed or not allowed] in this TA" or "EC access [allowed or not allowed] in this PLMN" or "EC access [allowed or not allowed]." The breadth of the restriction message may be based on operator preference and/or features or services to which WD 210 has subscribed.

Message 250 is sent by MME 220 to eNB 215. Message 250 may include an indication as to whether or not WD 210 is authorized to use EC access. In some embodiments, the indication may be included in a cause code as part of message 250, such as "EC access [allowed or not allowed] in this TA," "EC access [allowed or not allowed] in this PLMN," or "EC access [allowed or not allowed]." For example, in some embodiments, message 250 may be an S1 message that includes, for example, "EC access [allowed or not allowed] in this TA." This may be part of a handover restriction list (HRL). In some embodiments, message 250 may comprise a NAS accept or reject message for WD 210.

The NAS message may include the authorization indication in a cause code or other such field.

Message 255 is sent by eNB 215 to WD 210. Message 255 includes an indication that WD 210 is, or is not, authorized to access EC features. For example, in some embodiments, message 255 may comprise a NAS accept message that include the indication. From this, if WD 210 requested EC access, then WD 210 now knows that EC access is allowed in this cell, TA, or PLMN. WD 210 may store the indication as to whether or not EC access is allowed along with a corresponding identification of the respective cell, TA or PLMN. Over time, WD 210 may develop a list of cells, TA, PLMNs where EC access is, and is not, authorized. In certain embodiments, after WD 210 receives notice that it is authorized to access EC features, WD 210 may establish a wireless connection with eNB 215. In some embodiments, once WD 210 knows that it is authorized for EC access, it may camp on the EC resources and/or the EC area of the cell supported by eNB 215.

Alternatively, in some embodiments, WD 210 may be denied EC access in message 255. For example, if message 255 is an S1 message, then MME 220 may provide eNB 215 with an indication that WD 210 is not authorized for EC access. In some instances, WD 210 may be attempting access the network in an EC area. Because EC access is not authorized for WD 210 (e.g., via HSS), registration may fail, and an indicator set by MME will make its way to WD 210 via messages 250 and 255. In some embodiments, eNB 215 may reject or release the RRC connection towards WD 210 and message 255 may include the reason for the rejection. In some embodiments, the registration may succeed but with a limited or reduced set of resources or capabilities (as compared to a WD that is authorized for EC access).

WD 210 may store the information indicating that EC access is not allowed as long as WD 210 is in the same tracking area (or in the same PLMN). Accordingly, WD 210 may not attempt to access EC features in this tracking area (or PLMN). In some embodiments, WD 210 may also not camp on EC resources when and/or where it is not authorized for EC access. Once the indication has been received, processed, and stored, WD 210 may then search for another cell to camp on (e.g., a cell in which it is in an NC area). In some scenarios this may require WD 210 to move from the EC area of the cell to the NC area of the cell. If no other cell offering normal coverage is found, WD 210 may be out of coverage.

In some scenarios, WD 210 may attempt network access from a NC area. Even though EC access is rejected, the attach/registration will succeed in the NC area. Then, if WD 210 moves into an EC area, the connection may be released, since WD 210 is not authorized for EC access. In some embodiments, rather than disconnecting, or stopping service, WD 210 may instead receive downgraded, restricted, or otherwise limited service. For example, in some embodiments, the wireless connection between WD 210 and eNB 213 may use fewer wireless resources than a connection might use if WD 210 was authorized for EC.

This may also apply when WD 210 initially attempts to access the network from an EC area when it is not authorized for EC access. In such a scenario, MME 220 may indicate to eNB 215 (e.g., new indicator in appropriate message during S1 establishment) that for WD 210, communication in an EC area is not allowed or is to be downgraded in some way. MME 220 may send the information (e.g., in an S1 Initial Context Setup Request message) via eNB 215 to WD 210 (e.g., included as part of the HRL which specifies roaming, area and access restrictions).

In certain embodiments, it may be desirable to prevent a WD for which EC access has been denied from repeatedly asking for service while in an area where EC is offered. In such an embodiment, the indicator sent by MME 220, and received by WD 210 in message 255, will alert WD 210 that EC access is not allowed as long as WD 210 is in the same tracking area or in the same PLMN. In such a scenario, WD 210 may not select any cell in this tracking area, or PLMN, for which only EC access is available nor may it request access to EC features from any of the cells in the non-authorized area(s).

Figure 3:
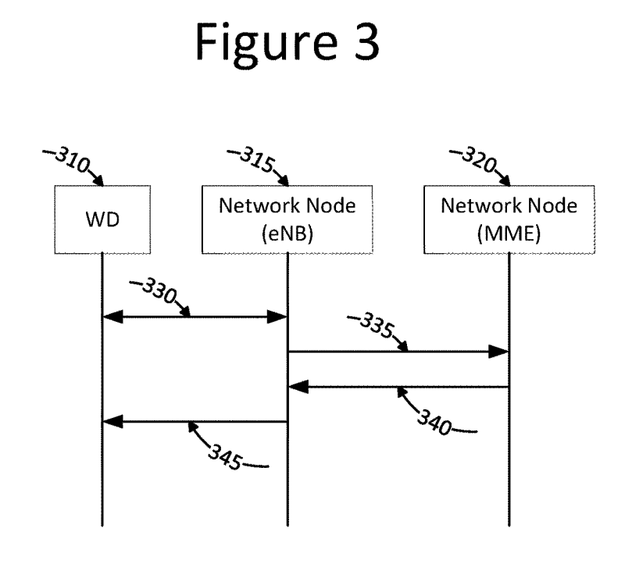
FIG. 3 illustrates a signalling diagram of the exchange of signals used in releasing a wireless connection as a wireless device moves from a normal coverage area to an enhanced coverage area, in accordance with a particular embodiment.

FIG. 3 illustrates a signalling diagram of the exchange of signals used in releasing a wireless connection as a wireless device moves from a normal coverage area to an enhanced coverage area, in accordance with a particular embodiment. As depicted, there is a single WD, WD 310 and two network nodes, network nodes 315 and 320. In this particular signalling diagram network node 315 is an eNB and network node 320 is an MME. To aid in the readability of this description, network node 315 shall be referred to as eNB 315 and network node 320 shall be referred to as MME 320. Although these particular types of network nodes are being used for purposes of this description, any other similar network nodes may be used (e.g., eNB 315 may be BTS 315). Moreover, although two different network nodes are depicted, in some embodiments, two or more of the network nodes (or at least the functions relevant herein that are performed by a particular network node) may be combined into a single network node. That is to say, the components and devices pictured in FIG. 3 are simply for purposes of discussion and should not be construed as a narrowing of the claimed invention. In addition, for simplicity each exchange between components and devices is represented as a single arrow, however each arrow may represent one or more actual messages. In addition, wireless connection 330 is not a specific signal or message, but rather represents a current, on-going, wireless connection between WD 310 and eNB 315. In some embodiments, connection 330 may be an S1 connection.

In this signalling diagram it may be assumed that WD 310 has previously received an indication that it is not authorized for EC access. Moreover, it may be assumed that wireless connection 330 was established while WD 310 was in a NC area, and that now WD 310 is moving into, or has moved into, an EC area. Message 335 is sent by eNB 315 to MME 320. Message 335 is sent to initiate a release of connection 330. For example, message 335 may comprise a WD Context Release Request. In some embodiments, message 335 may include an indication as to the cause (e.g., "EC access not allowed"). Message 335 may be sent when eNB determines or detects (e.g., via signal quality reports) WD 310 is moving from an NC area to an EC area of the cell.

Message 340 is sent by MME 320 to eNB 315. Message 340 may acknowledge the release of connection 330. Message 340 may be sent without getting a message from an HSS because MME 320 may have previously received, and stored, an indication that WD 310 is not authorized for EC access. Message 345 is sent by eNB 315 to WD 310. Message 345 may, for example, be an RRC Connection Release message. In some embodiments, message 345 may include an indication as to the cause (e.g., "EC access not allowed in this TA").

Figure 4A:
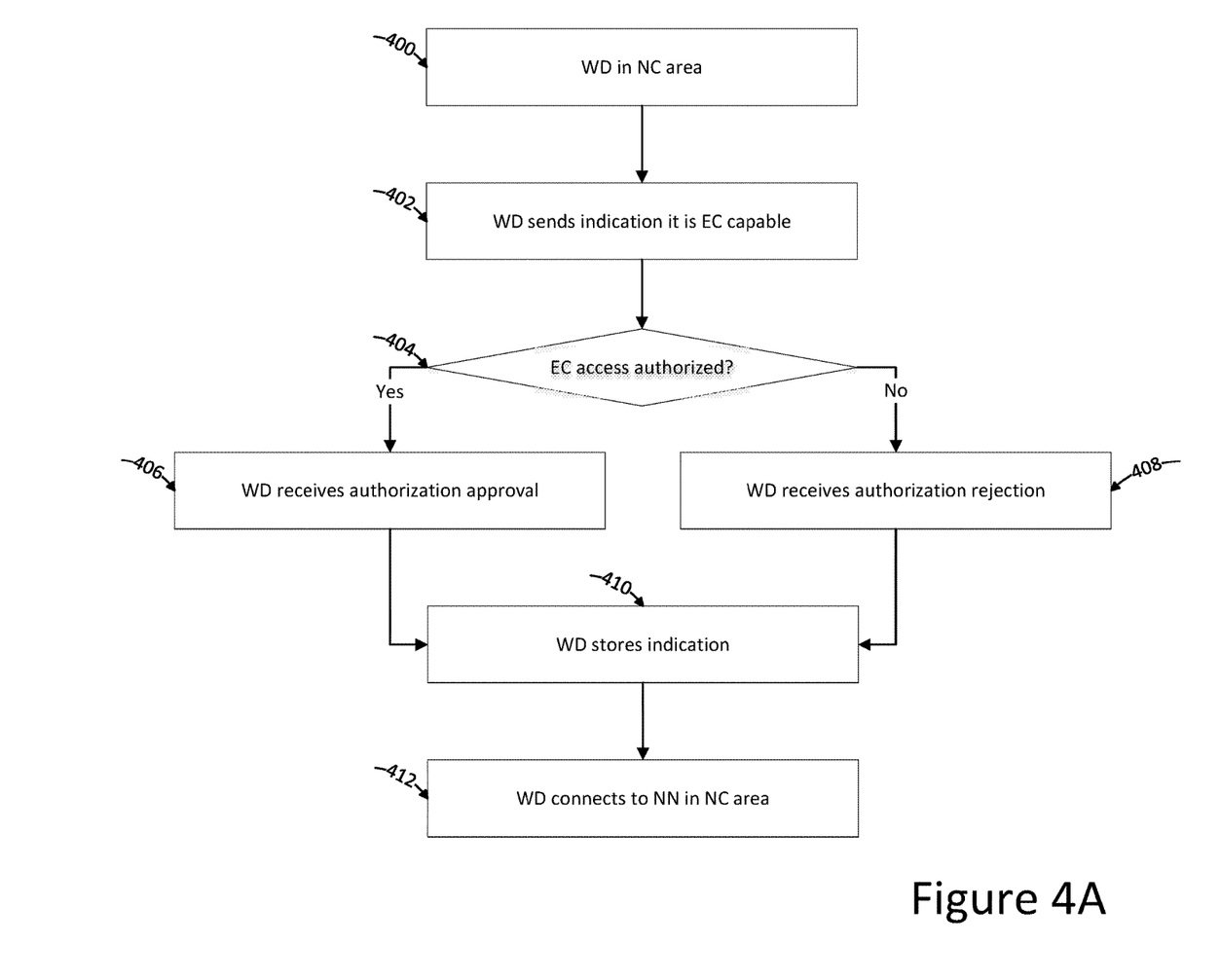
FIGS. 4A and 4B illustrate a flowchart of a wireless device's initial access attempt to a wireless network, in accordance with particular embodiments.
Figure 4B:
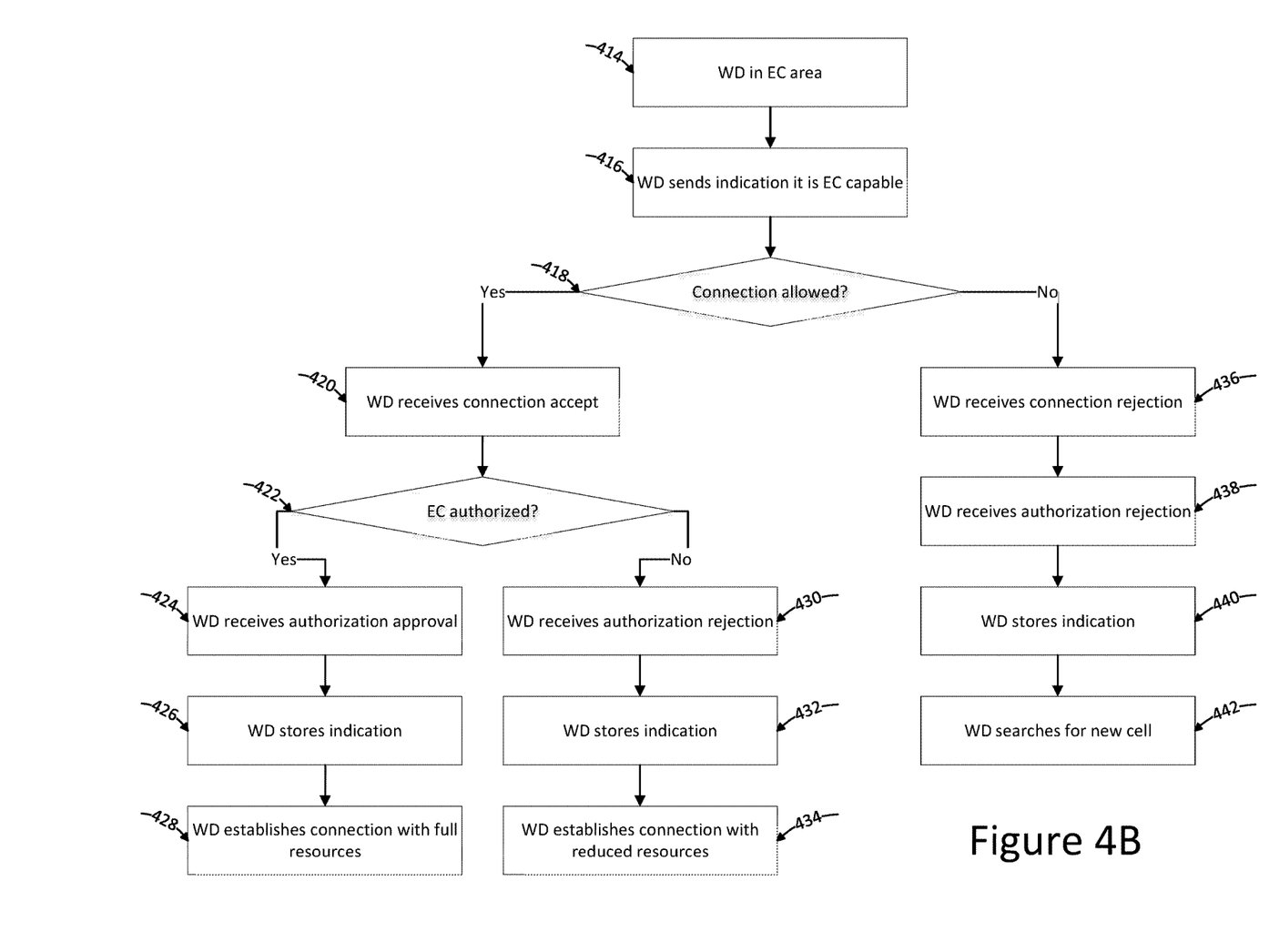

FIGS. 4A and 4B illustrate a flowchart of a wireless device's initial access attempt to a wireless network, in accordance with particular embodiments. In the scenario depicted in this flowchart, it may be assumed that the network operator again uses EC features to provide additional range or coverage within the respective cells. FIGS. 4A and 4B depict some of the variations in the initial access depending on where the WD is located when making the access attempt. Starting with FIG. 4A, at step 400 the WD is accessing the network from an NC area.

At step 402, the WD sends a message requesting a wireless connection with the network. The message may include an indication that the WD is EC capable. The indication may be explicit (e.g., a flag, field code, or other such indication) or implicit (e.g., the connection request may be made using a pre-determined set of wireless resources reserved for EC use). In some embodiments, the WD may provide an indication as to whether it is using EC or NC features. This indication may be included with the indication that it supports EC features, or it may be sent in a separate message.

At step 404 a determination is made as to whether EC access is authorized for this particular WD. The determination may be made at any of a variety of different network nodes (e.g., HSS, MME, eNB, etc.). Depending on where the decision is made, an indication of whether or not EC access is authorized may be passed through one or more additional network nodes on its way to being sent to the WD.

If EC access is authorized, then at step 406 the WD receives a message authorizing EC access. The authorization may be included in an acknowledgement of the connection request sent at step 402. If EC access is not authorized, then at step 408 the WD receives a message denying EC access. This denial may be part of the acknowledgement of the connection request sent at step 402.

At step 410 the WD stores the indication as to whether or not it is authorized for EC access. This indication may be added to a database or other organization of data that keeps track of different indications for different cells or TAs. In this manner, the WD may develop an internal knowledge of which cells or TAs it can use EC access and which it cannot. Similarly, the network nodes may store the indication. In some embodiments, the indication may be stored or maintained with other indications for other WDs to allow the network nodes to track EC authorization on a per WD basis.

At step 412 the WD connects to a network node, such as an eNB, from the NC area. Because the WD is accessing the network from an NC area, the WD may connect regardless of whether or not EC access was authorized.

Moving now to FIG. 4B, at step 414 a WD is attempting to connect to the wireless network from an EC area. At step 416 the WD sends an indication that it is EC capable. As in step 402, this indication may be explicit or implicit. The indication may be sent as part of a connection request. The request may also include an indication that the WD is attempting to access the network from an EC area. In some embodiments, the indication may be in a different message.

At step 418 a determination is made as to whether or not the connection request is to be granted. This may be based on factors other than whether or not the WD is authorized for EC access.

If the connection is allowed, the method proceeds to step 420 where the WD receives an acknowledgement of the connection request. In addition to the acknowledgement of the connection request, the message may also include an indication as to whether or not the WD is authorized for EC access.

If the WD is authorized for EC access, then at step 424 the WD may receive an indication that it is authorized for EC access. The indication may be received in the same message acknowledging the connection request. At step 426 the WD stores the indication that it is authorized for EC access in this particular cell (or TA, or PLMN based on the received indication). Then at step 428 the WD establishes a wireless connection with the appropriate network node (e.g., an eNB). This connection may utilize a full complement of EC wireless resources as designated by, for example, the network operator.

If the WD is not authorized for EC access, then at step 430 the WD may receive an indication that it is not authorized for EC access. This may be included with the message acknowledging the connection request. At step 432 the WD stores the indication that it is not authorized for EC access (in this cell, TA, or PLMN). The network node that made the decision, and any of the network nodes between the deciding network node and the WD may also store the indication. At step 434 the WD establishes a wireless connection with the appropriate network node (e.g., an eNB). This connection may use reduced resources. That is, the wireless resources used for the WD, when it is not authorized for EC access, may be less than the full complement of wireless resources that may be allocate to a WD that is authorized for EC access. If the connection is not allowed, the method proceeds to step 436 where the WD receives a connection rejection message (e.g., a NACK) indicating that the WD's request for a connection has been rejected. For example, the EC access resources may already be in use with other WDs. As another example, the network operator may not allow EC access for non-authorized WDs (as opposed to limited access as provided at step 434). At step 438 the WD receives an indication that it is not authorized for EC access. This indication may be received with the rejection message. That is, steps 436 and 438 may be performed in parallel (e.g., through different fields within the same message) with a single message containing both the connection acceptance/rejection and the EC authorization/rejection. At step 440 the WD stores the indication that it is not authorized to use EC features (in this cell, TA, or PLMN). At step 442 the WD searches for another cell. The WD may search for a cell for which it can use NC coverage. The WD may also search for another cell for which it is authorized for EC access or for which it does not have an indication that it is not authorized for EC access (e.g., in a different TA). The WD may also search for a cell for which it had received authorization for EC access.

Figure 5:
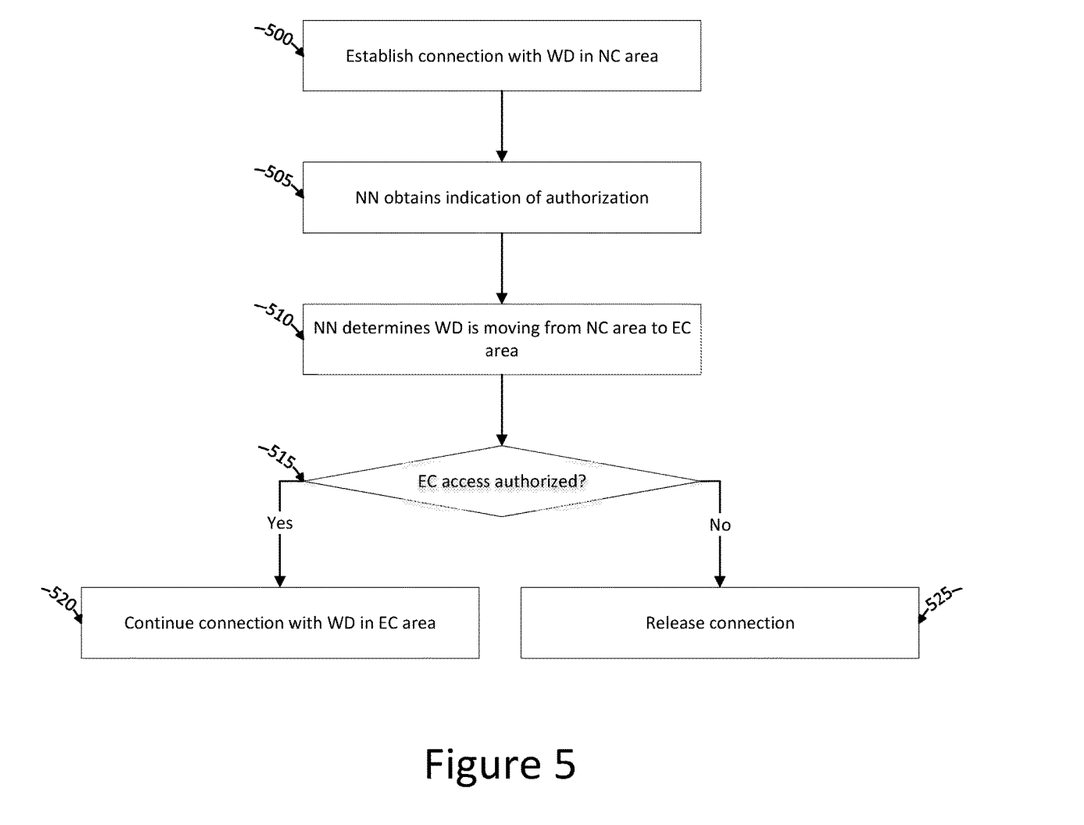
FIG. 5 illustrates a flowchart of the change in wireless resources as a wireless device moves from a normal coverage area to an enhanced coverage area, in accordance with a particular embodiment.

FIG. 5 illustrates a flowchart of the change in wireless resources as a wireless device moves from a normal coverage area to an enhanced coverage area, in accordance with a particular embodiment. In this flowchart, the EC features are used to provide additional coverage. Other scenarios may exist where, for example, a WD starts off using a first service that only needs NC features (e.g., streaming a video) but then switches to different service that requires EC features (e.g., virtual reality). The method starts at step 500 with the WD establishing a wireless connection with a network node (NN in the flowchart) while the WD is in an NC area. At step 505 the network node obtains an indication as to whether the WD is authorized or is not authorized for EC access. This indication may be stored internally by the network node. The indication may have been received in a message from another network node or it may be determined from information present in the network node.

At step 510 the network node determines that the WD is moving from the NC area to the EC area. The network node may make this determination based on, for example, signal quality reports received from the WD. For example, if the network node sees that the signal quality is decreasing, the network node may determine that the WD is moving away from the network node, and thus moving towards the EC area. As another example, this determination may be determined from a specific message sent by the WD. For example, the WD may detect that is approaching an EC area or leaving the NC area and may send a message to the network node alerting the network node that the WD is approaching an EC area.

If, at step 515, it is determined that EC access is authorized, then at step 520 the wireless connection between the network node and the WD may continue as the WD moves into the EC area. This may involve increasing or switching the wireless resources used to maintain the wireless connection.

If, at step 515, it is determined that EC access is not authorized, the network node may release the wireless resources used for the wireless connection. In some embodiments, if the WD is not authorized for EC access, the WD may be switched to a reduced set of EC resources. In either case, the WD may then begin (or may have already begun) searching for a new cell.

Figure 6:
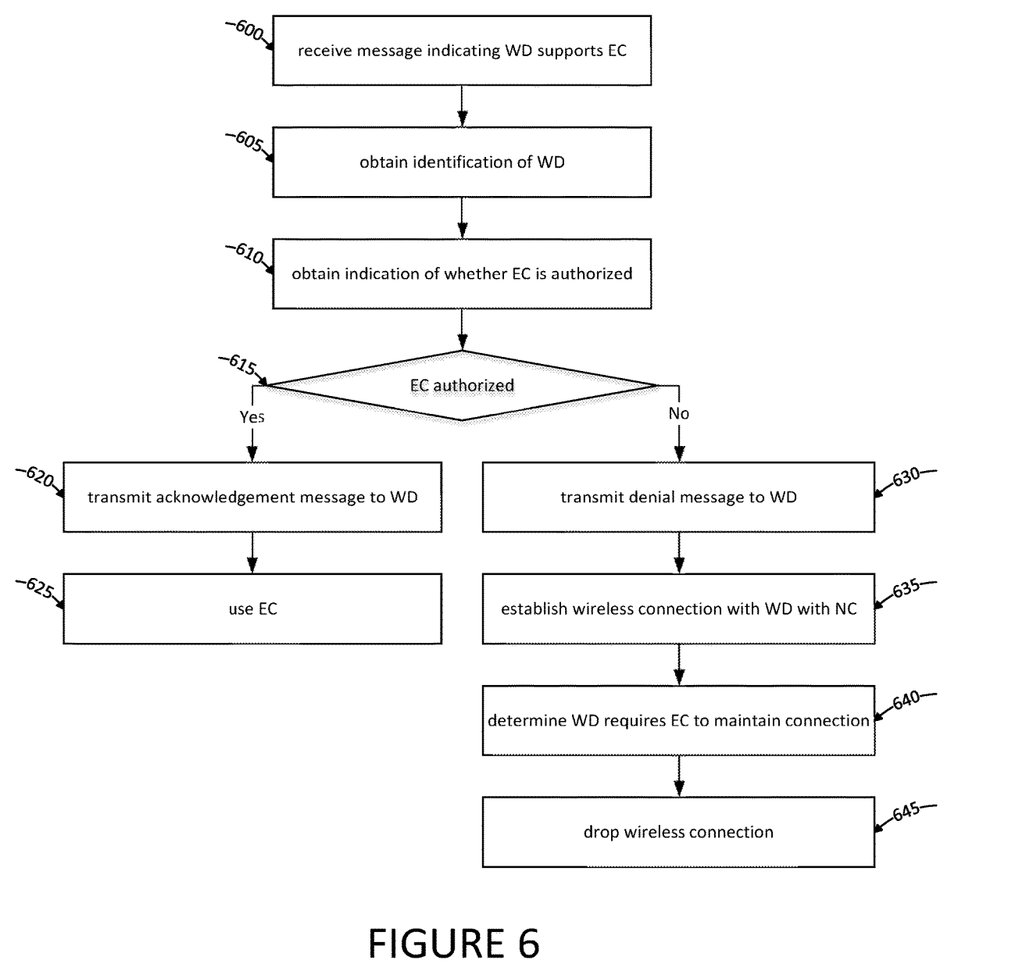
FIG. 6 illustrate a flowchart of a method for authorizing utilization of enhanced coverage, in accordance with a particular embodiment.

FIG. 6 illustrate a flowchart of a method for authorizing utilization of enhanced coverage, in accordance with a particular embodiment. The method depicted in the flowchart of FIG. 6 is a method performed by a particular network node, an eNB. As may be apparent any of the steps described herein may be performed by one or more other or different network nodes (e.g., an MME or an HSS). However, for purposes of simplicity this description will just refer to the one network node.

At step 600, the network node receives a first message indicating that a wireless device supports one or more enhanced coverage features. The enhanced coverage features may be that the WD is able to access the wireless network from an extended area that is supported by one or more EC features. The first message may provide the indication that the WD supports EC features in a variety of ways. For example, in some embodiments, the first message may be a radio resource control message. In such a scenario, the RRC message may include an explicit indication that the WD supports the one or more EC features. As another example, the first message may be received using a first radio resource. The first radio resource may comprise one or more resources that a network operator has reserved for use by wireless devices that support EC and are operating in an EC mode. These resources may also be used to signal support for EC without the WD having to operate in an EC mode. That is, a WD operating in a NC mode may just use the EC resources to send the first message to indicate it supports EC coverage, and then return to using the radio resources for NC.

At step 605 an identification of the first wireless device is obtained. The identification of the WD may be used in determining whether or not this WD is authorized for EC access. The WD may be identified using any of a variety of different identifiers. For example, the WD may be identified by a MAC address, a IMSI number, an S-TMSI (SAE Temporary Mobile Subscriber Identity) number or any other such identifier.

At step 610 an indication of whether or not the WD is authorized to access the one or more EC features is obtained. Depending on where the network node is in relation to where the necessary data is stored, the indication may be obtained from information maintained in the network node or it may be obtained from a message received from another network node. For example, in some embodiments, the network node may receive an update location acknowledgement message from a home subscriber server. The message may be received directly or indirectly (e.g., via another network node).

If, at step 615, EC access is authorized, the method continues to step 620. If, at step 615, EC access is not authorized, the method continues to step 630.

At step 620 an acknowledgement message is transmitted to the WD. The acknowledgement message may serve multiple purposes. It may, for example, comprise an ACK granting a request for a connection. It may, for example, comprise an indication that the WD is authorized to access EC features. The WD may store this indication in its own internal memory for use in the future (e.g., future cell selection decisions).

At step 625 the WD uses the authorized EC features. Depending on the embodiment and scenario, this may comprise WD continuing to use a wireless connection that uses the EC features. For example, if the WD uses resources reserved for EC features to signal that it supports EC features, then the WD may continue to use those resources. As another example, if the WD sent a message with an explicit indication that it supports EC features, and that message was sent using NC radio resources, then at step 625 it may start using the EC features.

At step 630 a denial message is transmitted. Depending on the embodiment and/or scenario, the denial message may comprise an indication that the WD is not authorized to use the EC features. In some embodiments, the denial message may also include a rejection of the attempt to establish a wireless connection. For example a NACK message may be transmitted that rejects the connection request and the NACK message may comprise a cause code indicating that EC access not authorized. This may occur, for example, when a WD is attempting to establish the wireless connection from an EC area in a TA in which EC access is only allowed for authorized WDs.

For purposes of the following steps, it may be assumed that the WD is within an area supported by NC. At step 635 a wireless connection may be established with the WD that does not use the EC features because the WD was not authorized to access EC features.

At step 640 it is determined that the first wireless device requires one or more EC features to maintain the wireless connection. For example, the WD may have moved farther away from the base station providing the wireless connection. That is, the WD may have moved from an NC area to an EC area. At step 645, the wireless connection with the WD is dropped. At which point, the WD may attempt to find another cell with which to establish a wireless connection. In some embodiments, rather than dropping the wireless connection, the network node may attempt to hand-over the WD to a neighbor cell or to use a reduced set of EC resources or features.

The steps described above are merely illustrative of certain embodiments. It is not required that all embodiments incorporate all the steps above nor that the steps be performed in the exact order depicted in FIG. 6. For example, in some embodiments, instead of dropping the wireless connection at step 645, the wireless connection may instead be downgraded, limited. or otherwise scaled back. Furthermore, some embodiments may include steps not illustrated in FIG. 6. For example, in some embodiments, the network node may receive a message indicating that a WD is moving from a NC area to an EC area.

The steps illustrated in FIG. 6, and described above, may be performed through a computer program product that may, for example, be executed by the components and equipment illustrated in FIG. 1. For example, storage 163 may comprise computer readable media on which a computer program can be stored. The computer program may include instructions which cause processor 162 (and any operatively coupled entities and devices, such as interface 161 and/or storage 163) to execute methods according to embodiments described herein. The computer program and/or computer program product may thus provide a device configured to perform any steps herein disclosed.

Figure 7:
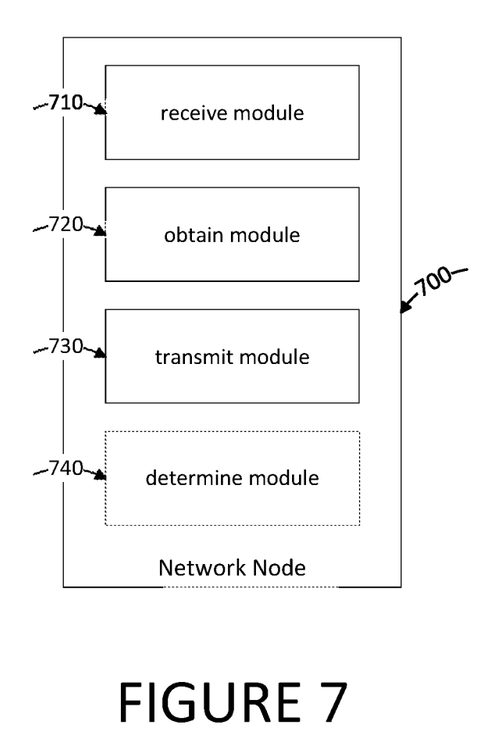
FIG. 7 illustrate a schematic block diagram of the functional modules used in authorizing utilization of enhanced coverage, in accordance with a particular embodiment.

FIG. 7 illustrate a schematic block diagram of the functional modules used in authorizing utilization of enhanced coverage, in accordance with a particular embodiment. In particular, there is depicted the functional modules of a particular network node 700. Other embodiments may include more, fewer, or different functional modules. Moreover, a single depicted module may represent multiple similar modules. For example, obtain module 720 may comprise two different obtain modules or provide the functionality of two obtain modules. The modules may comprise software, computer programs, sub-routines, libraries, source code, or any other form of executable instructions that are run by, for example, a processor. In general terms, each functional module depicted in FIG. 7 may be implemented in hardware and/or in software. Preferably, one or more or all functional modules may be implemented by processor 162, possibly in cooperation with storage 163. Processors 162 and storage 163 may thus be arranged to allow processors 162 to fetch instructions from storage 163 and execute the fetched instructions to allow the respective functional module to perform any steps or functions disclosed herein. The illustrated modules may further be configured to perform other functions or steps not explicitly described with respect to the respective module, including providing any features or functions disclosed with respect to any of the other figures. In this FIG. 7, network node 700 comprises receive module 710, obtain module 720, transmit module 730, and determine module 740.

Receive module 710 may be configured to receive a first message indicating that a first wireless device supports one or more enhanced coverage features. Depending on where network node 700 is within the network, the message may be received directly from the WD or it may be received from another network node. In some embodiments, the first message may comprise a radio resource control message. The RRC message may include one or more fields that may be used to indicate that the WD supports one or more EC features and/or that the WD is currently using one or more EC features. In certain embodiments, the first message may be received using a first radio resource. The first radio resource may be specifically reserved for use by wireless devices that support enhanced coverage and/or are using one or more EC features.

Obtain module 720 may be configured to obtain an identification of the first wireless device. The identification of the first wireless device may, for example, be obtained from the first message. Obtain module 720 may also be configured to obtain, based on the identification of the first wireless device, an indication of whether the first wireless device is authorized to access the one or more enhanced coverage features or the first wireless device is not authorized to access the one or more enhanced coverage features. In some embodiments, the indication may be obtained from information maintained in network node 700. In certain embodiments, the indication may be obtained from a message received from another network node. For example, network node 700 may receive an update location acknowledgement message from a home subscriber server that may contain the indication.

Transmit module 730 may be configured to, upon obtaining an indication that the WD is authorized to access EC features, transmit an acknowledgement message to the WD. The acknowledgment message may provide the WD with an indication that it is authorized to use EC features. The message may specify the locations (e.g., cells, TAs, PLMNs) where such authorization is granted. In some scenarios, transmit module 730 may be further configured to continue a wireless connection with the WD using EC features.

Transmit module 730 may also be configured to, upon obtaining an indication that the WD is not authorized to access the EC features, transmit a denial message to the WD. The denial message may provide the WD with an indication that it is not authorized to use EC features. The denial message may specify the locations (e.g., cells, TAs, PLMNs) where such authorization is denied. In some scenarios, after sending the denial message, transmit module 730 may transmit a message to the WD to establish a wireless connection with the WD that does not use the EC features.

Determine module 740 may be configured to determine that WD requires EC features to maintain a wireless connection. In such an instance, transmit module 730 may be configured to drop the wireless connection with the WD. This may occur, for example, when the WD initially only needs NC features to maintain a wireless connection but then moves to an area where it needs EC features to maintain the wireless connection.

In view of the above disclosure, at least some of the herein disclosed embodiments may be summarized as allowing a network operator to be able to control access and utilization of EC features. Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. Similarly, while a number of different combinations of elements, component or steps have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for authorizing utilization of enhanced coverage, the method comprising:
   receiving a first message indicating that a first wireless device is capable of using one or more enhanced coverage features;
   obtaining an identification of the first wireless device;
   obtaining, based on the identification of the first wireless device, an authorization indication of whether the first wireless device is authorized to access the one or more enhanced coverage features or the first wireless device is not authorized to access the one or more enhanced coverage features the authorization indication independent of the capabilities of the first wireless device;
   upon obtaining the authorization indication indicating that the first wireless device is authorized to access the one or more enhanced coverage features, transmitting an acknowledgement message to the first wireless device notifying the first wireless device that it is authorized to use the one or more enhanced coverage features; and
   upon obtaining the authorization indication indicating that the first wireless device is not authorized to access the one or more enhanced coverage features, transmitting a denial message to the first wireless device notifying the first wireless device that it is not authorized to use the one or more enhanced coverage features even though the wireless device is capable of using the one or more enhanced coverage features.

2. The method of claim 1, wherein the first message was received using a first radio resource, the first radio resource reserved for wireless devices that support enhanced coverage and are using an enhanced coverage feature.

3. The method of claim 1, wherein the authorization indication indicating that the first wireless device is authorized to access the one or more enhanced coverage features is based on a network operator authorizing the first wireless device to use the one or more enhanced coverage features.

4. The method of claim 1, further comprising, upon obtaining the authorization indication indicating that the first wireless device is not authorized to access the one or more enhanced coverage features, establishing a wireless connection with the first wireless device without using the one or more enhanced coverage features even though the first wireless device is capable of using the one or more enhanced coverage features.

5. The method of claim 4, further comprising:
determining that the first wireless device requires the one or more enhanced coverage features to maintain the wireless connection; and
dropping the wireless connection with the first wireless device.

6. The method of claim 1, wherein obtaining, based on the identification of the first wireless device, the authorization indication indicating whether the first wireless device is authorized to access the one or more enhanced coverage features or the first wireless device is not authorized to access the one or more enhanced coverage features comprises receiving an update location acknowledgement from a home subscriber server.

7. A network node for authorizing utilization of enhanced coverage, the network node comprising:
a wireless interface configured to receive a first message indicating that a first wireless device is capable of using one or more enhanced coverage features;
a processor coupled to the wireless interface and configured to:
obtain an identification of the first wireless device;
obtain, based on the identification of the first wireless device, an authorization indication of whether the first wireless device is authorized to access the one or more enhanced coverage features or the first wireless device is not authorized to access the one or more enhanced coverage features the authorization indication independent of the capabilities of the first wireless device;
upon obtaining the authorization indication indicating that the first wireless device is authorized to access the one or more enhanced coverage features, transmit an acknowledgement message to the first wireless device notifying the first wireless device that it is authorized to use the one or more enhanced coverage features; and
upon obtaining the authorization indication indicating that the first wireless device is not authorized to access the one or more enhanced coverage features, transmit a denial message to the first wireless device notifying the first wireless device that it is not authorized to use the one or more enhanced coverage features.

8. The network node of claim 7, wherein the first message was received using a first radio resource, the first radio resource reserved for wireless devices that support enhanced coverage and are using an enhanced coverage feature.

9. The network node of claim 7, wherein the authorization indication that the first wireless device is authorized to access the one or more enhanced coverage features is based on a network operator authorizing the first wireless device to use the one or more enhanced coverage features.

10. The network node of claim 7, wherein the wireless interface is further configured to, upon obtaining the authorization indication indicating that the first wireless device is not authorized to access the one or more enhanced coverage features, establish a wireless connection with the first wireless device without using the one or more enhanced coverage features even though the first wireless device is capable of using the one or more enhanced coverage features.

11. The network node of claim 10, wherein:
the processor is further configured to determine that the first wireless device requires the one or more enhanced coverage features to maintain the wireless connection; and
the wireless interface is further configured to drop the wireless connection with the first wireless device.

12. The network node of claim 7, wherein:
the wireless interface is further configured to receive an update location acknowledgement from a home subscriber server; and
the processor is further configured to obtain, based on the identification of the first wireless device and the received update location acknowledgement from the home subscriber server, the authorization indication of whether the first wireless device is authorized to access the one or more enhanced coverage features or the first wireless device is not authorized to access the one or more enhanced coverage features.

13. A network node for authorizing utilization of enhanced coverage comprising a processor and computer readable storage media, the storage media containing instructions executable by the processor, whereby the network node is operative to:
receive a first message indicating that a first wireless device is capable of using one or more enhanced coverage features;
obtain an identification of the first wireless device;
obtain, based on the identification of the first wireless device, an authorization indication of whether the first wireless device is authorized to access the one or more enhanced coverage features or the first wireless device is not authorized to access the one or more enhanced coverage features the authorization indication independent of the capabilities of the first wireless device;
upon obtaining the authorization indication indicating that the first wireless device is authorized to access the one or more enhanced coverage features, transmit an acknowledgement message to the first wireless device notifying the first wireless device that it is authorized to use the one or more enhanced coverage features; and
upon obtaining the authorization indication indicating that the first wireless device is not authorized to access the one or more enhanced coverage features, transmit a denial message to the first wireless device notifying the first wireless device that it is not authorized to use the one or more enhanced coverage features even though the first wireless device is capable of using the one or more enhanced coverage features.

14. The network node of claim 13, wherein the first message was received using a first radio resource, the first radio resource reserved for wireless devices that support enhanced coverage and are using an enhanced coverage feature.

15. The network node of claim 13, wherein the authorization indication indicating that the first wireless device is authorized to access the one or more enhanced coverage features is based on a network operator authorizing the first wireless device to use the one or more enhanced coverage features.

16. The network node of claim 13, wherein the network node is further configured to, upon obtaining the authorization indication indicating that the first wireless device is not authorized to access the one or more enhanced coverage features, establish a wireless connection with the first wireless device without using the one or more enhanced coverage features even though the first wireless device is capable of using the one or more enhanced coverage features.

17. The network node of claim 16, wherein the network node is further configured to:
  determine that the first wireless device requires the one or more enhanced coverage features to maintain the wireless connection; and
  drop the wireless connection with the first wireless device.

18. The network node of claim 13, wherein the network node configured to obtain, based on the identification of the first wireless device, the authorization indication indicating whether the first wireless device is authorized to access the one or more enhanced coverage features or the first wireless device is not authorized to access the one or more enhanced coverage features is further configured to receive an update location acknowledgement from a home subscriber server.

* * * * *